United States Patent
Nicholson et al.

(10) Patent No.: US 10,242,341 B2
(45) Date of Patent: Mar. 26, 2019

(54) AUTOMATIC TASKBAR GROUPING BY USER TASKS

(75) Inventors: John W. Nicholson, Holly Springs, NC (US); Philip J. Jakes, Durham, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 755 days.

(21) Appl. No.: 13/039,365

(22) Filed: Mar. 3, 2011

(65) Prior Publication Data
US 2012/0227007 A1    Sep. 6, 2012

(51) Int. Cl.
*G06F 3/0481* (2013.01)
*G06Q 10/10* (2012.01)
*G06F 9/451* (2018.01)

(52) U.S. Cl.
CPC .......... *G06Q 10/10* (2013.01); *G06F 3/0481* (2013.01); *G06F 9/451* (2018.02)

(58) Field of Classification Search
CPC ........ G06F 3/0481; G06F 9/451; G06Q 10/10
USPC ........................................................ 715/779
See application file for complete search history.

(56) References Cited

U.S. PATENT DOCUMENTS

| | | | | |
|---|---|---|---|---|
| 5,564,002 A * | 10/1996 | Brown | ........................... | 715/778 |
| 5,796,403 A * | 8/1998 | Adams et al. | ................ | 715/803 |
| 7,882,448 B2 * | 2/2011 | Haug | ............................. | 715/779 |
| 2001/0035882 A1 * | 11/2001 | Stoakley et al. | ............... | 345/779 |
| 2002/0123916 A1 * | 9/2002 | Godin et al. | ...................... | 705/7 |
| 2009/0055413 A1 * | 2/2009 | Audet | ........................... | 707/100 |
| 2010/0023506 A1 * | 1/2010 | Sahni et al. | ....................... | 707/5 |
| 2010/0180200 A1 * | 7/2010 | Donneau-Golencer et al. ............ 715/705 |
| 2012/0096392 A1 * | 4/2012 | Ording et al. | ................ | 715/783 |

* cited by examiner

*Primary Examiner* — William L Bashore
*Assistant Examiner* — Gregory A Distefano
(74) *Attorney, Agent, or Firm* — Ference & Associates LLC

(57) ABSTRACT

Systems, methods and products are described that provide taskbar grouping by user task. One aspect includes identifying a plurality of applications open on a computing device; identifying one or more objects open in said plurality of applications; determining one or more objective measures of said one or more objects belonging to a particular task; and automatically grouping objects sharing one or more objective measures of belonging to a particular task together in a common taskbar icon of a display.

16 Claims, 4 Drawing Sheets

AUTOMATIC TASKBAR GROUPING BY USER TASKS

BACKGROUND

In an operating system, such as WINDOWS XP operating system, taskbar icons may be grouped together in the taskbar. This grouping of taskbar icons is done by application. For example, when multiple word processing application documents (such as MICROSOFT Word documents) are opened on a computer, in the user display the taskbar icons for these documents are grouped together in the taskbar in a common taskbar icon, having the number of taskbar icons (representing the number of open MICROSOFT Word documents) listed in the common taskbar icon. Left clicking on the word processing application's common taskbar icon shows the word processing application documents currently open in a popup view. Further, clicking on one of the open document's taskbar icon in the popup view causes that document to be brought to the foreground in the display.

In MICROSOFT WINDOWS 7 operating system, the taskbar icon grouping features were changed slightly to use an application ID property, which allows for disparate processes to be grouped under a common taskbar icon or multiple views from one process to be grouped separately under multiple taskbar icons. WINDOWS XP, MICROSOFT and WINDOWS are registered trademarks of Microsoft Corporation in the United States and other countries.

BRIEF SUMMARY

In summary, one aspect provides a method comprising: identifying a plurality of applications open on a computing device; identifying one or more objects open in said plurality of applications; determining one or more objective measures of said one or more objects belonging to a particular task; and automatically grouping objects sharing one or more objective measures of belonging to a particular task together in a common taskbar icon of a display.

Another aspect provides a system comprising: one or more processors; and one or more display devices; wherein, responsive to execution of computer program instructions accessible to the one or more processors, the one or more processors are configured to: identify a plurality of applications open on the system; identify one or more objects open in said plurality of applications; determine one or more objective measures of said one or more objects belonging to a particular task; and automatically group objects sharing one or more objective measures of belonging to a particular task together in a common taskbar icon of the one or more display devices.

A further aspect provides a computer program product comprising: a computer readable storage medium having computer readable program code embodied therewith, the computer readable program code comprising: computer readable program code configured to identify a plurality of applications open on a computing device; computer readable program code configured to identify one or more objects open in said plurality of applications; computer readable program code configured to determine one or more objective measures of said one or more objects belonging to a particular task; and computer readable program code configured to automatically group objects sharing one or more objective measures of belonging to a particular task together in a common taskbar icon of a display.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
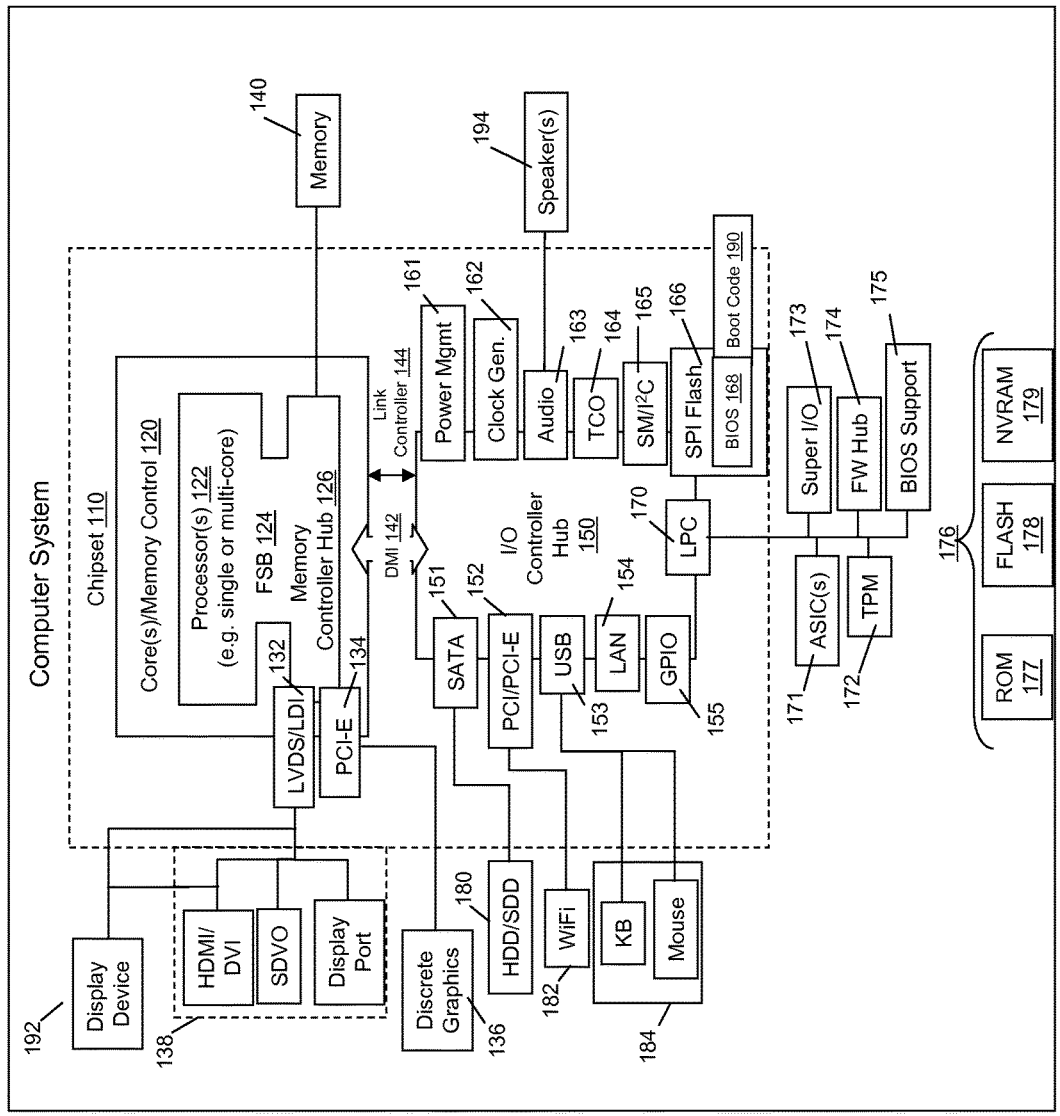
FIG. 1 illustrates an example circuitry of a computer system.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, etc. In other instances, well-known structures, materials, or operations are not shown or described in detail to avoid obscuring aspects of the invention.

While WINDOWS 7 uses the application ID property allowing for disparate processes to be grouped under a common taskbar icon or multiple views from one process to be grouped separately under multiple taskbar icons, what most users want to do is group taskbar icons together by task (that is, by the project or theme that logically associates different windows with one another). For example, for a given task (task A), a user might have a browser open (such as INTERNET EXPLORER browser) and also have a spreadsheet document open (such as an EXCEL spreadsheet). For another task (task B), a user may have a word processing document open (such as MICROSOFT Word document), a browser open (such as INTERNET EXPLORER browser), a command prompt, et cetera. The user should be able to group these items' taskbar icons together on the taskbar not by process or application, but by "task" (in this example, by task A or task B). EXCEL and INTERNET EXPLORER are registered trademarks of Microsoft Corporation in the United States and other countries. In the example of task A and task B, the user should have task A taskbar icons grouped together in a common taskbar icon or entry, showing the browser and the spreadsheet together, and task B taskbar icons grouped together, showing the word processing document and the browser, command prompt, et cetera together.

Accordingly, an embodiment provides for automatically grouping taskbar icons by task. Automatic grouping of taskbar icons by task into common taskbar icons may be accomplished by utilizing an objective measure of a file or object belonging to a particular task, followed by grouping taskbar icons via a shared objective measure. Various examples of utilizing an objective measure of a file or object belonging to a task are provided herein. Once an objective measure of a file or an object belonging to a particular task is obtained, the applications handling those files or objects are grouped together, automatically and by task, in common taskbar icons. This permits a user working on a particular task or project to quickly access files or objects needed to complete the task or project.

The illustrated example embodiments will be best understood by reference to the figures. The following description is intended only by way of example, and simply illustrates certain example embodiments.

While various other circuits, circuitry or components may be utilized, FIG. 1 depicts a block diagram of one example of computing system circuits, circuitry or components. The example depicted in FIG. 1 may correspond to computing systems such as the THINKPAD series of personal computers sold by Lenovo (US) Inc. of Morrisville, N.C. However, as is apparent from the description herein, embodiments may include other features or only some of the features of the example illustrated in FIG. 1.

The example of FIG. 1 includes a so-called chipset 110 (a group of integrated circuits, or chips, that work together, chipsets) with an architecture that may vary depending on manufacturer (for example, INTEL, AMD, ARM, etc.). The architecture of the chipset 110 includes a core and memory control group 120 and an I/O controller hub 150 that exchanges information (for example, data, signals, commands, et cetera) via a direct management interface (DMI) 142 or a link controller 144. In FIG. 1, the DMI 142 is a chip-to-chip interface (sometimes referred to as being a link between a "northbridge" and a "southbridge"). The core and memory control group 120 include one or more processors 122 (for example, single or multi-core) and a memory controller hub 126 that exchange information via a front side bus (FSB) 124; noting that components of the group 120 may be integrated in a chip that supplants the conventional "northbridge" style architecture.

In FIG. 1, the memory controller hub 126 interfaces with memory 140 (for example, to provide support for a type of RAM that may be referred to as "system memory" or "memory"). The memory controller hub 126 further includes a LVDS interface 132 for a display device 192 (for example, a CRT, a flat panel, a projector, et cetera). A block 138 includes some technologies that may be supported via the LVDS interface 132 (for example, serial digital video, HDMI/DVI, display port). The memory controller hub 126 also includes a PCI-express interface (PCI-E) 134 that may support discrete graphics 136.

In FIG. 1, the I/O hub controller 150 includes a SATA interface 151 (for example, for HDDs, SDDs, 180 et cetera), a PCI-E interface 152 (for example, for wireless connections 182), a USB interface 153 (for example, for input devices 184 such as a digitizer, keyboard, mice, cameras, phones, storage, other connected devices, et cetera.), a network interface 154 (for example, LAN), a GPIO interface 155, a LPC interface 170 (for ASICs 171, a TPM 172, a super I/O 173, a firmware hub 174, BIOS support 175 as well as various types of memory 176 such as ROM 177, Flash 178, and NVRAM 179), a power management interface 161, a clock generator interface 162, an audio interface 163 (for example, for speakers 194), a TCO interface 164, a system management bus interface 165, and SPI Flash 166, which can include BIOS 168 and boot code 190. The I/O hub controller 150 may include gigabit Ethernet support.

The system, upon power on, may be configured to execute boot code 190 for the BIOS 168, as stored within the SPI Flash 166, and thereafter processes data under the control of one or more operating systems and application software (for example, stored in system memory 140). An operating system may be stored in any of a variety of locations and accessed, for example, according to instructions of the BIOS 168. As described herein, a device may include fewer or more features than shown in the system of FIG. 1.

Figure 2:
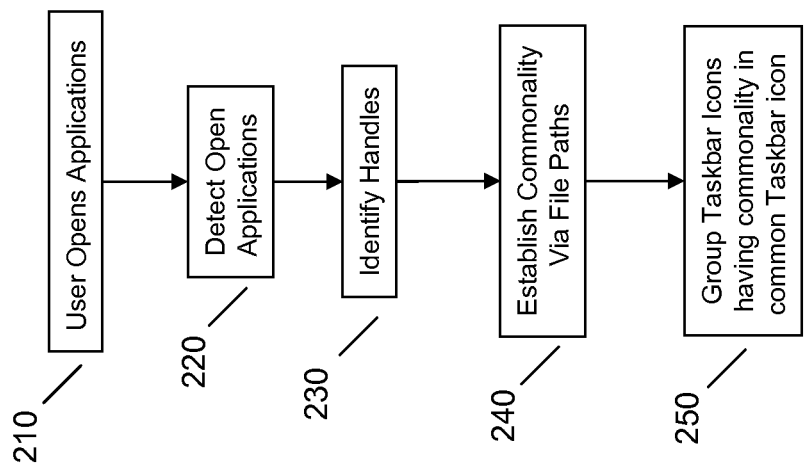
FIG. 2 illustrates an example of automatic grouping of taskbar icons by task.

Referring to FIG. 2, an embodiment provides for automatically grouping of taskbar icons by task. When a user opens a plurality of applications 210, such an automatic grouping is accomplished for example by detecting the open applications 220 and open handles 230 from processes or threads. A handle is a data structure that represents an open instance of a basic operating system object an application interacts with (such as files, registry keys, et cetera). The handles may be utilized to detect and establish commonality in the file paths 240 of the objects opened (for example, word-processing documents and spreadsheets opened from the same folder or sub-folder). This commonality may be utilized as a measure of an object or file belonging to a particular task. The taskbar icons for the various items opened by the user are then grouped together in the taskbar under a common taskbar icon specific to the task for which the commonality is associated, based on having commonality in the file paths 250. For example, if more than one process (word processing application and spreadsheet application) has handles open from a particular folder, for example a common folder under "My Documents", then these are grouped together by task.

Figure 3A:
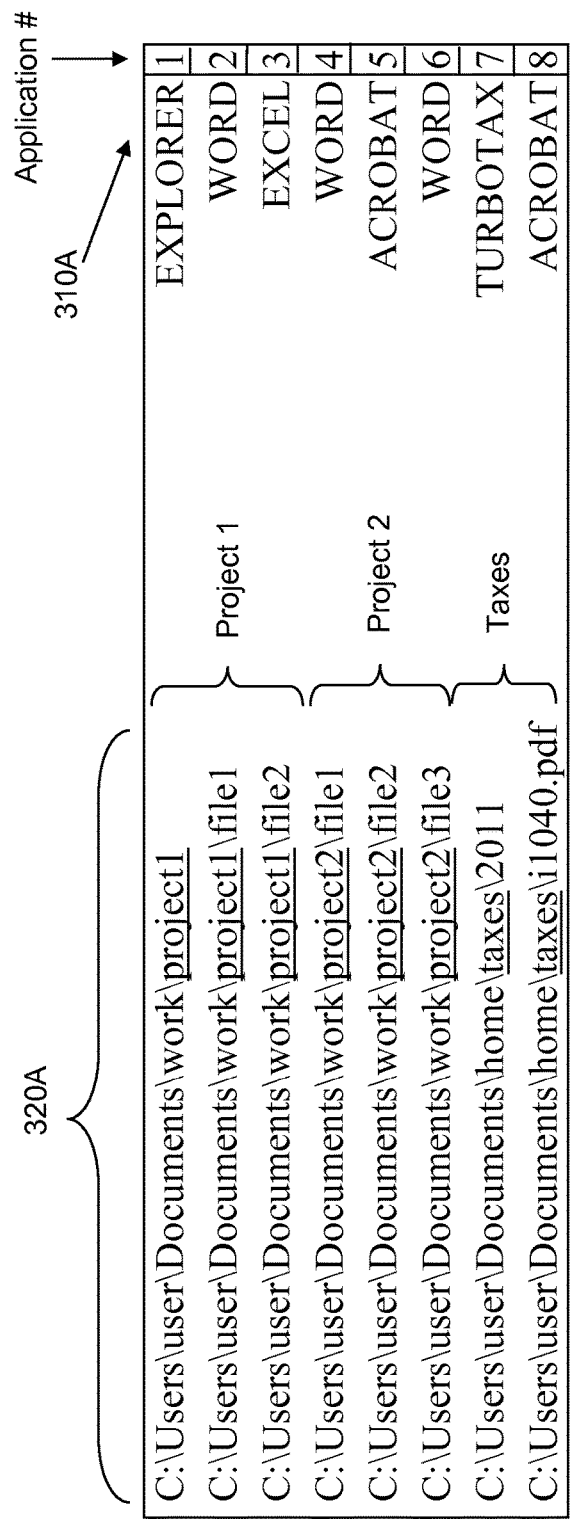
FIG. 3A illustrates an example of file paths and associated applications used in automatic grouping of taskbar icons by task.

For example, in FIG. 3A, assume a user is working on three tasks ("Project 1", Project 2" and "Taxes"). If in working on these three tasks simultaneously, the user has different applications and associated files open (for a document, a spreadsheet, a browser window, a tax or bookkeeping application, and a command prompt), the user may wish to group these objects' taskbar icons by these tasks ("Project 1", Project 2" and "Taxes"). Thus, for a set of handles open by the indicated applications 310A, associated file paths 320A are obtained. The applications (ACROBAT, Word, EXCEL, TURBOTAX and (WINDOWS) Explorer) can thus be grouped by task, as ascertained via the commonality (indicated by underlining) in the file paths 320A. TURBOTAX is a registered trademark of Intuit Inc. in the United States and other countries. ACROBAT is a registered trademark of Adobe Systems Incorporated in the United States and other countries.

Figure 3B:
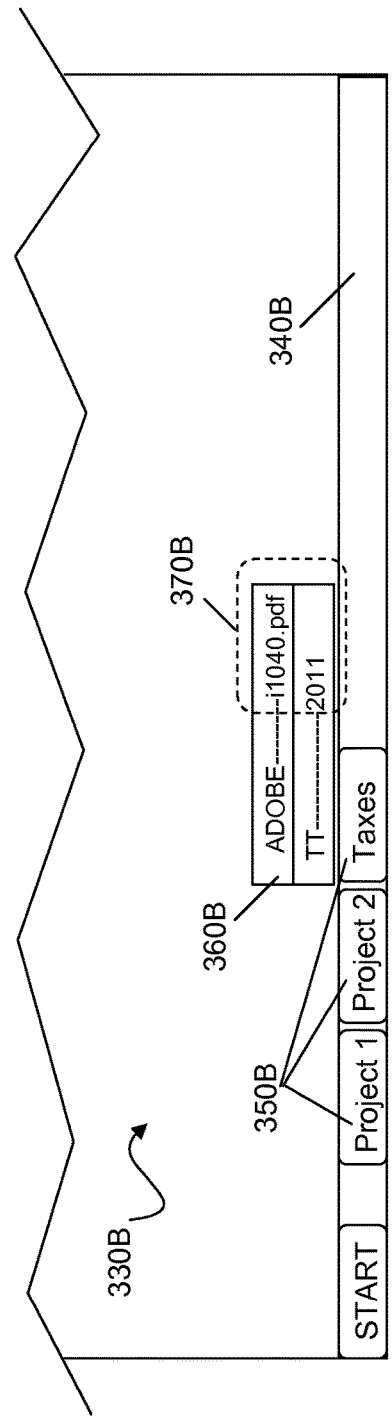
FIG. 3B illustrates an example of a view of taskbar icons grouped by task.

For example, "Project 1" is defined as a task, and taskbar icons for applications Explorer (1), Word (2) and EXCEL (3) are grouped in the taskbar together under a common taskbar icon (refer to FIG. 3B). For "Project 2", defined as a task, taskbar icons for applications Word (4), ACROBAT (5), Word (6) are grouped in the taskbar together. Finally, for "Taxes", defined as a task, taskbar icons for applications TURBOTAX (7) and ACROBAT (8) are grouped in the taskbar together.

Associating the open handles as belonging to a common task can be accomplished for example via a clustering technique. For example, k-means or quality threshold (QT) clustering techniques may be applied to establish clusters belonging to tasks. It should be noted that it is common that a computing system has many handles (semaphores, drivers, et cetera) open at any one time. Many of these handles may be ignored for automatic taskbar icon grouping/clustering. If file paths are utilized to cluster handles, commonality in the file path may be leveraged to identify common tasks.

Referring to FIG. 3B, an example view of common taskbar icons 350B grouping applications by task is illustrated. On a user's display 330B, a taskbar 340B appears near the bottom. The common taskbar icons 350B for "Project 1", "Project 2" and "Taxes" are located in the taskbar 340B. Contrary to conventional arrangements, the common taskbar icons 350B do not group taskbar icons for a given application, but rather the taskbar icons are grouped by task, as determined via one of the methods described herein. Thus, the "Taxes" icon, involving (as described with reference to FIG. 3A) a user's home taxes project applications and files, includes two applications. In this case, the applications are TURBOTAX and ACROBAT, and the files are a TURBOTAX file and a ".pdf" file 370B. Responsive to the user clicking on the "Taxes" common taskbar icon, these files are listed in a popup 360B and thus grouped together, allowing the user to easily locate the files of "Taxes" and switch back and forth between them while working on a home taxes project.

Figure 4:
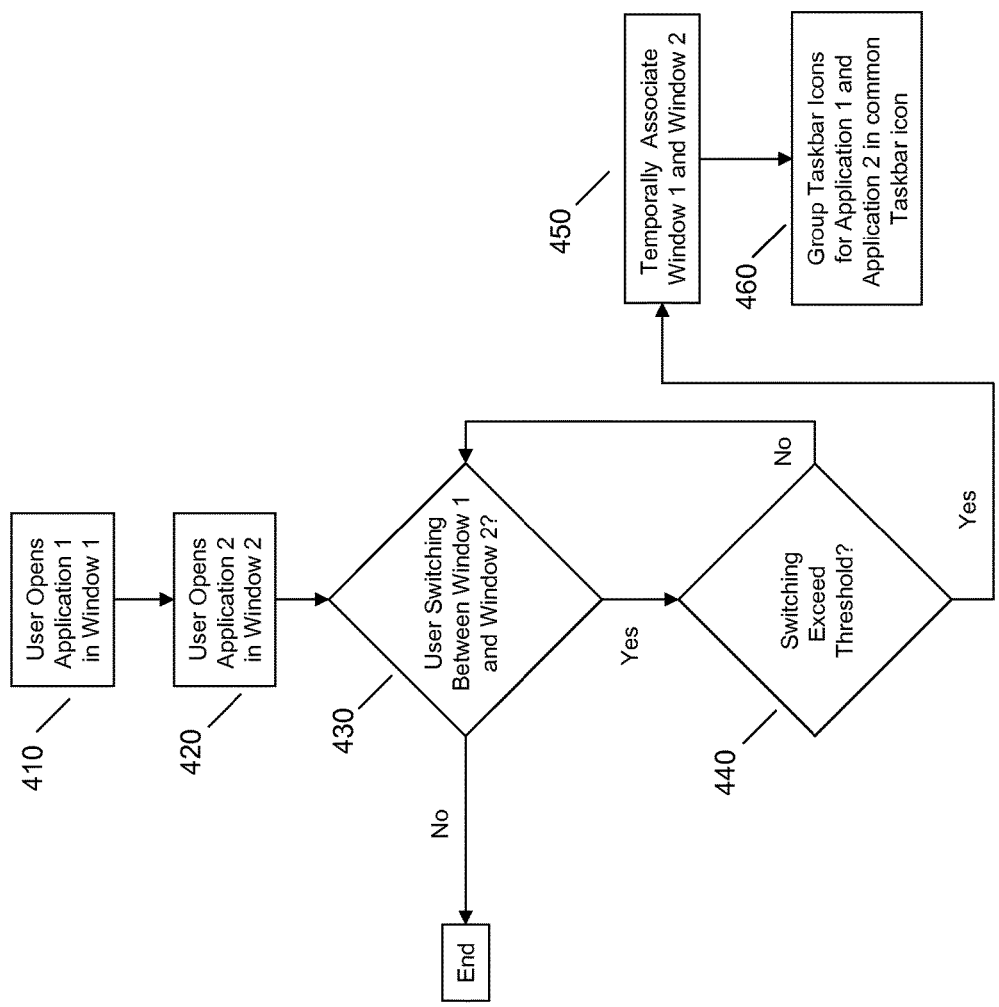
FIG. 4 illustrates another example of automatic grouping of taskbar icons by task.

Referring to FIG. 4, an embodiment provides for temporally associating tasks. Responsive to a user opening a plurality of applications (Application 1 and Application 2) in a plurality of views (WINDOW 1 and WINDOW 2) at 410 and 420, an embodiment detects the user switching between WINDOW 1 and WINDOW 2 at 430, as when working in one application view and then another application view successively. A predetermined switching threshold may be established (for example, the switching threshold is set at X switches per minute=threshold, or the like) to indicate a switching level indicative of applications related to a common task. Such a switching threshold may be used as an objective measure of a file or object belonging to a particular task.

Responsive to the user exceeding the switching threshold, an embodiment associates WINDOW 1 and WINDOW 2 as being associated with a common task 450 and groups taskbar icons for these applications in a common taskbar icon 460. The temporal grouping may result in a display as depicted for example in FIG. 3B.

Temporal switching involves a user frequently (as defined for example by a predetermined switching threshold) switching between open applications (repeatedly selecting or bringing different applications to the foreground), and having these applications assigned to a common task. For example, assume a user opens a browser displaying a browser directed to MSDN (Microsoft Developer Network) and a VISUAL STUDIO application and file. If the user is switching frequently between the open browser and the VISUAL STUDIO application, these taskbar icons are grouped together as belonging to a common task in a taskbar. MSDN and VISUAL STUDIO are registered trademarks of Microsoft Corp. in the United States and other countries. As another example, if a user has a browser open to WINDCHILL and an EXCEL spreadsheet open, and frequently switches between these, then the WINCHILL browser and EXCEL spreadsheet taskbar icons are grouped together in the taskbar. WINDCHILL is a registered trademark of Windchill Technology Inc. in the United States and other countries.

In an embodiment employing temporal association of tasks, the frequency of switching may be utilized to associate taskbar icons as belonging to a common task. However, switching between common programs (such as a web browser open to a PANDORA URL, an email program, et cetera) and "task specific" programs, such as the WINCHILL browser and an EXCEL spreadsheet, described above, should not become associated as a belonging to a common task, as the user is expected to switch back to common programs frequently, even if not associated with an ongoing project or task. Embodiments provide that common programs and task specific programs are not temporally associated such that their taskbar icons are not grouped together in the taskbar. This can be accomplished through a variety of mechanisms, such as predefining "common programs" that are excluded from temporal association, or implementing a support vector machine or a neural network such that false positives and false negatives are minimized. PANDORA is a registered trademark of Pandora Media, Inc. in the United States and other countries.

Embodiments may be implemented in one or more computing devices configured appropriately to execute program instructions consistent with the functionality of the embodiments of the invention as described herein. In this regard, FIG. 1 describes a non-limiting example of such a computing device. Embodiments may be implemented using a variety of computing systems, such as desktops, workstations, servers, smartphones, slates, tablets, and the like.

As will be appreciated by one skilled in the art, various aspects may be embodied as a system, method or computer program product. Accordingly, aspects may take the form of an entirely hardware embodiment or an embodiment including software and/or hardware aspects that may all generally be referred to herein as a "circuit," "module" or "system." Furthermore, aspects may take the form of a computer program product embodied in one or more computer readable medium(s) having computer readable program code embodied therewith.

Any combination of one or more non-signal computer readable medium(s) may be utilized. The non-signal computer readable medium may be a computer readable storage medium. A computer readable storage medium may be, for example, an electronic, magnetic, optical, electromagnetic, infrared, or semiconductor system, apparatus, or device, or any suitable combination of the foregoing. More specific examples (a non-exhaustive list) of a computer readable storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Program code embodied on a computer readable medium may be transmitted using any appropriate medium, including but not limited to wireless, wireline, optical fiber cable, RF, etc., or any suitable combination of the foregoing.

Computer program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of network, including a local area network (LAN) or a wide area network (WAN), or the connection may be made through other devices (for example, through the Internet using an Internet Service Provider) or through a hard wire connection, such as over a USB connection.

Aspects are described herein with reference to flowchart illustrations and/or block diagrams of methods, apparatus (systems) and computer program products according to various embodiments. It will be understood that each block of the flowchart illustrations and/or block diagrams, and combinations of blocks in the flowchart illustrations and/or block diagrams, can be implemented at least in part by computer program instructions. These computer program instructions may be provided to a processor of a general purpose computer, special purpose computer, or other programmable data processing apparatus to produce a machine, such that the instructions, which execute via the processor of the computer or other programmable data processing apparatus, implement the functions/acts specified in the flowchart and/or block diagram block or blocks.

The computer program instructions may also be stored in a computer readable medium that can direct a computer, other programmable data processing apparatus, or other device(s) to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other device(s) to cause a series of operational steps to be performed on the computer, other programmable apparatus or other device(s) to produce a computer implemented process such that the instructions which execute on the computer or other programmable apparatus provide processes for implementing the functions/acts specified in the flowchart and/or block diagram block or blocks.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying drawings, it is to be understood that this description is not limiting and that various other changes and modifications may be affected therein by one skilled in the art without departing from the scope or spirit of the disclosure.

What is claimed is:

1. A method comprising:
    identifying a plurality of applications open on a computing device;
    identifying one or more files open in said plurality of applications;
    determining one or more objective measures of said one or more files belonging to a particular task, wherein said one or more objective measures comprises an indication that a switching threshold has been exceeded; and
    automatically grouping, without user intervention, files sharing one or more objective measures of belonging to a particular task together in a common taskbar icon of a display, wherein said one or more files are open in different applications of said plurality of applications.

2. The method according to claim 1, wherein said one or more objective measures comprises a commonality in file paths.

3. The method according to claim 2, wherein the commonality in file paths is derived from one or more handles.

4. The method according to claim 1, wherein the switching threshold is predefined as a number of times a user switches between files per unit time.

5. The method according to claim 1, wherein said one or more objective measures comprises a commonality in file paths of said one or more files, and an indication that a switching threshold has been exceeded.

6. The method according to claim 1, wherein the one or more files comprise one or more of: a word processing file, a spread sheet file, and a browser page.

7. The method according to claim 1, further comprising:
    responsive to user interaction with a common taskbar icon, displaying a popup listing of files associated with a particular task.

8. The method according to claim 7, further comprising:
    responsive to user interaction with the popup listing, bringing a file in the popup listing interacted with to a foreground view.

9. A system comprising:
    one or more processors; and
    one or more display devices;
    wherein, responsive to execution of computer program instructions accessible to the one or more processors, the one or more processors:
    identify a plurality of applications open on the system;
    identify one or more files open in said plurality of applications;
    determine one or more objective measures of said one or more files belonging to a particular task, wherein said one or more objective measures comprises an indication that a switching threshold has been exceeded; and
    automatically group, without user intervention, files sharing one or more objective measures of belonging to a particular task together in a common taskbar icon of the one or more display devices, wherein said one or more files are open in different applications of said plurality of applications.

10. The system according to claim 9, wherein said one or more objective measures comprises a commonality in file paths.

11. The system according to claim 10, wherein the commonality in file paths is derived from one or more handles.

12. The system according to claim 9, wherein the switching threshold is predefined as a number of times a user switches between files per unit time.

13. The system according to claim 9, wherein said one or more objective measures comprises a commonality in file paths of said one or more files, and an indication that a switching threshold has been exceeded.

14. The system according to claim 9, wherein the one or more files comprise one or more of: a word processing file, a spread sheet file, and a browser page.

15. The system according to claim 9, wherein, responsive to execution of computer program instructions accessible to the one or more processors, the one or more processors:

responsive to user interaction with a common taskbar icon, display a popup listing of files associated with a particular task; and responsive to user interaction with the popup listing, bring a file in the popup listing interacted with to a foreground view.

16. A computer program product comprising:

a computer readable storage medium having computer readable program code embodied therewith, the computer readable program code being executable by a processor and comprising:

computer readable program code that identifies a plurality of applications open on a computing device;

computer readable program code that identifies one or more files open in said plurality of applications;

computer readable program code that determines one or more objective measures of said one or more files belonging to a particular task, wherein said one or more objective measures comprises an indication that a switching threshold has been exceeded; and computer readable program code that automatically groups, without user intervention, files sharing one or more objective measures of belonging to a particular task together in a common taskbar icon of a display, wherein said one or more files are open in different applications of said plurality of applications.

\* \* \* \* \*